March 10, 1970   L. K. ROWE, JR   3,499,661
LATERAL PLANING FRAME AND BUMPER ASSEMBLY
Filed March 22, 1969
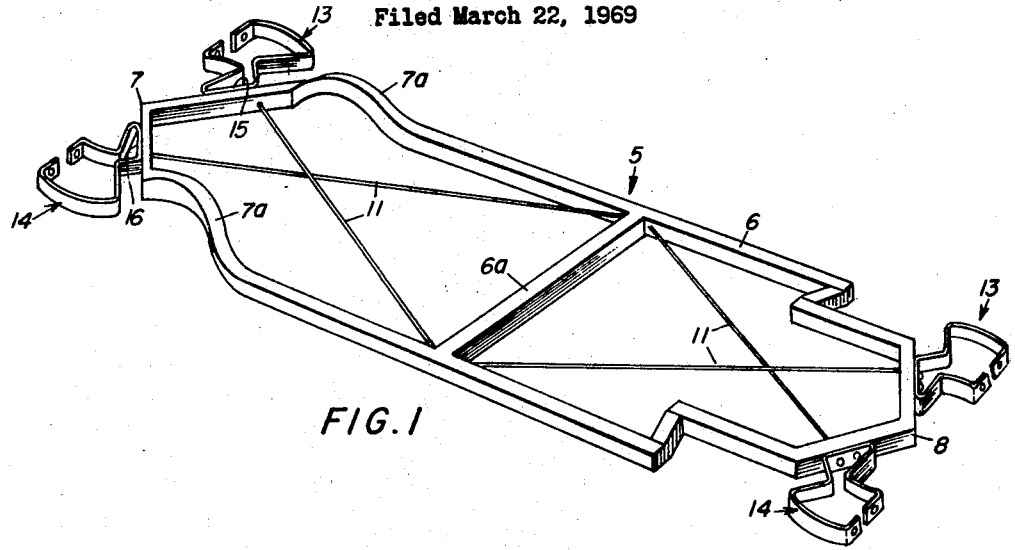
INVENTOR
LUTHER K. ROWE, JR.
BY Raphael Semmes
ATTORNEY United States Patent Office 3,499,661
Patented Mar. 10, 1970

3,499,661
LATERAL PLANING FRAME AND
BUMPER ASSEMBLY
Luther Kemp Rowe, Jr., Box 129A,
Boyds, Md. 20720
Filed Mar. 22, 1968, Ser. No. 715,249
Int. Cl. B62d 21/00
U.S. Cl. 280—106          1 Claim

ABSTRACT OF THE DISCLOSURE

A lateral planing frame and bumper assembly for motor vehicles having a rigid frame with wedge-shaped fore and aft ends, each carrying a spaced bumper. The bumpers are mounted on the projecting ends of a plurality of leaf spring push bars fixed at their bases to the angular portions of respective frame ends. The angular structure and relative arrangement of the push bars coact with the wedge-shaped frame ends to directionally convert the excessive impact force of a head-on collision into a lesser lateral planing force, generally similar to a side swipe or glancing action, thereby causing lateral separation of the colliding vehicles at the inception of the collision.

BACKGROUND OF INVENTION

For many years, the automotive industry has been experimenting with various innovations for the promotion of maximum safety on our highways, but, unfortunately, the results of past research efforts have been limited to the internal body shell, and some of the more noteworthy of these were the installation of seat belts, safety door latches, and padded dash and sun visors. The basic structure of present day motor vehicles has an undesirable tendency to cause the vehicle to track into an opposing force due to the unfavorable condition created by the design of the front bumper and frame assembly. Conventionally, the front bumper is attached to the frame by supporting braces at each end, and, consequently, this leaves the weak point in the center of the bumper. Therefore, as most accidents will prove, this central weak point will result in a cave-in or a U-shaped front end. In fact, this U-shaped front end will actually align the vehicles into trees, poles, bridge rails, guard rails, etc., as well as to cause them to interlock with other vehicles.

The prime object of the present invention is to produce an assembly which will greatly reduce the number of highway traffic fatalities and bodily injury cases suffered when victims are involved in highway accidents. The lateral planing frame and bumper assembly of this invention is an external innovation made to the body structure, and its design is such that in the event of a collision, lateral vehicle movement is enforced due to a directional shift of the opposing forces. There is created a lateral planing action very similar to that taking place when two boats collide substantially head on. The lateral motion or glancing blow created by the lateral planing frame and bumper assembly eliminates the excessive impact or "g force" suffered by occupants when involved in head-on collisions, and thereby greatly reduces the "g force" to such an extent as to materially limit the number of highway fatalities and bodily injury cases.

Another object of the invention is to reinforce the main frame of a vehicle against impact in critical areas, thereby reducing the weight of the main frame.

Still another object is to transfer force resulting from impact from one side of the vehicle and distribute that force to the opposite side of the frame structure near the center of the vehicle.

A further object is to maintain vehicle stability during collision by eliminating vehicle spin and whiplash.

With the above and other objects in view which will appear as the description proceeds, the invention consists in the novel features herein set forth, illustrated in the accompanying drawings, and more particularly pointed out in the appended claim.

THE DRAWINGS

Referring to the drawings in which numerals of like character designate similar parts throughout the several views:

FIG. 1 is a perspective view showing the wedge-shaped frame of a motor vehicle and the push rod structure;

FIG. 2 is a top plan view of the structure shown in FIG. 1 with the fore and aft bumpers and wheels added;

FIG. 3 is a fragmentary top plan view illustrating the action resulting from a head-on collision, the position of the vehicle being reversed from FIGS. 1 and 2; and FIG. 4 is an enlarged view of one of the push bar units.

SPECIFICATION

In the drawings, 5 generally represents the chassis of the motor vehicle which consists of an integrated metal frame structure 6 having laterally reduced, wedge-shaped fore and aft ends 7 and 8, respectively, reinforced crosswise substantially at the center by a cross bar 6a. Preferably, the wedge-shaped ends 7 and 8 taper at approximately 38° from their bases to a point approximately six inches behind their bumpers, which will be later described, and they project fore and aft over and beyond the respective axles 9a and 10a by approximately twenty-four inches. The forward end of the frame is arched and contoured as at 7a to accommodate the turning of the front wheels 9, and the rear end is simply reduced laterally to accommodate the rear wheels 10 on the rear axle 10a.

In order to minimize the weight of the frame 6, while at the same time providing sufficient strength at essential points, the frame is provided with reinforcing cross bars 11 which extend between the angular portions of the ends of 7 and 8 and substantially the central portion of the frame, being rigidly fixed as by welding. As will later appear, these reinforcing bars transfer force resulting from impact from one side and distribute the force to the opposite side near the center of the vehicle, thus maintaining vehicle stability during collision, while eliminating vehicle spin and whiplash.

The bumper and push bar arrangement at each of the frame ends 7 and 8 are substantially similar in structure, and, therefore, the description of one will be sufficient for a clear understanding of the invention.

Referring to FIG. 2, a bumper 12, having side portions which diverge rearwardly from its apex 12a, is mounted forward of the wedge-shaped end 7 of the frame by means of push bar units 13 and 14, with the bumper approximately six inches forward of the point of the front end 7 of the frame.

One form of push bar unit will best be seen in FIG. 4 where the unit 13, for example, is an integral structure and comprises two forwardly projecting leaf spring members 13a and 13b connected at their bases by a mounting strip 15. The springs of unit 14 are connected by a mounting strip 16. The units are attached by any suitable means, such as bolts 17, to the respective diverging side pieces of the wedge-shaped forward end 7 of the frame, as seen in FIG. 2.

It will be understood that the push bar units 13 and 14 are identical in structure, but their positions on the wedge-shaped end of the frame are reversed. Therefore, a description of the structure of one of these units, unit 13, FIG. 4, for example, will suffice for both. The outer leaf spring 13a extends at substantially right angles from the base of the unit for a predetermined distance, and at 13c is abruptly bent outwardly at substantially right angles to lie parallel with the supporting section of the wedge-shaped end of the frame 7. At point 13d, the outer spring is bent at a forward angle and terminates in a connecting ear 13e for connection to the bumper 12 by bolts or the like 17.

The innermost leaf spring 13b is bent from the base of the unit at an acute angle at 13f and extends toward the outer spring 13a for a predetermined distance where at 13g it is bent forwardly, substantially parallel with the adjacent portion of the spring 13a and terminates in a connecting ear 13h for connection to the bumper 12.

While the push bar units have been described and illustrated as comprising unitary structures, it will be understood, of course, that the leaf springs 13a and 13b may be separately constructed and assembled on the wedge-shaped frame end 7. Also, while certain specific contours have been described and shown in the drawings, these are simply for purposes of illustration and the invention is no way confined to these particular shapes and contours. The essential requirement for any push bar unit selected for use in this assembly is that the spring members be projected forwardly and outwardly and that they are contoured to laterally displace a head-on impact force in collision.

The frame and bumper assembly of this invention are effective in both minor and major accidents. Due to the early spring resilience of the push bars, the assembly functions much the same as a conventional bumper arrangement in cases of minor accidents. Of course, even in these cases, there is a tendency to shift the force laterally. However, in cases of major accidents involving an extensive "g force," the spring resilience of the units 13 and 14 and their particular relationship with the wedge-shaped ends of the vehicle frame has the effect of an extended leverage which, together with the resilience and outwardly directed positions of the push bars, transfers the head-on force into a lateral force, with the result that the vehicles tend to be separated as shown in FIG. 3. The action of the bumper 12 in this assembly is in effect a rocking action which guides the vehicles apart laterally. The design and arrangement of the push bars is such as to control and supervise the bending or rocking of the bumper.

The flat nature of the push bars and their direction of travel while bending will guide the bumper into the reinforced wedge-shaped frame. With the bumper bending to a maximum 38° plane, it forms a sled runner in effect, used in turn to promote vehicle separation, with no interlocking or restrictive frame members at this stage.

In cases of minor accidents, the spring push bars should provide up to twelve inches of cushioning effect. In cases of major accidents, the cushioning effect would continue to a maximum of twenty-four inches before glancing the resisting object from the heavy duty wedge-shaped frame. If two similarly equipped vehicles were to collide, the above safety measurements could be doubled. This is also true for rear end collisions in which case a longer overhang would increase the above safety measurements.

In the course of a collision, the stabilizer bars 11 reinforce the main frame against impact in critical areas and thereby reduce the weight of the frame. They also transfer force resulting from impact from one side and distribute the force to the opposite side of the frame structure near the center of the vehicle and maintain vehicle stability during collision by eliminating vehicle spin and whiplash.

From the foregoing, it is believed that the invention may be readily understood by those skilled in the art without further description, it being borne in mind that numerous changes may be made in the details disclosed without departing from the spirit of the invention as set forth in the following claim.

I claim:
1. A lateral planing frame and bumper assembly for motor vehicles, comprising a frame proper having its fore and aft ends transversely wedge-shaped with the apex of the wedge directed longitudinally outwardly of the frame, a transverse bumper spaced longitudinally outward from each wedge-shaped end, at least two resilient push bar units interposed between said bumper and wedge-shaped end and respectively secured to said bumper and wedge-shaped end on opposite sides of said apex, each of said push bar units including a pair of steel leaf spring members connected at their bases and respectively bent at combined longitudinal and laterally outward angles for combined longitudinal and laterally outward resilience with respect to their points of connection to said wedge-shaped end, and angularly disposed reinforcing rods extending between respective diverging portions of said wedge-shaped ends and opposite longitudinal sides of said frame, whereby the force of a head-on collision with another vehicle is angularly deflected and converted into a lateral planing force which tends to separate the colliding vehicles.

References Cited

UNITED STATES PATENTS

| | | | |
|---|---|---|---|
| 3,129,954 | 4/1964 | Duero | 280—106 |
| 1,421,757 | 7/1922 | Belden | 280—106 |
| 1,539,077 | 5/1925 | Cox | 293—93 |
| 1,365,593 | 1/1921 | Kraus | 293—91 |
| 1,363,201 | 12/1920 | Bowen | 293—91 |
| 2,349,940 | 5/1944 | Craig | 280—106 X |

PHILIP GOODMAN, Primary Examiner

U.S. Cl. X.R.

293—91